United States Patent [19]

Greischel et al.

[11] 4,094,737

[45] June 13, 1978

[54] PRESSURIZED-WATER REACTOR INSTALLATION

[75] Inventors: Christoph Greischel, Erlangen; Elmar Harand, Hochstadt; Franz Maritsch; Eberhard Michel, both of Erlangen, all of Germany

[73] Assignee: Siemens Aktiengesellschaft, Berlin and Munich, Germany

[21] Appl. No.: 787,443

[22] Filed: Apr. 14, 1977

[30] Foreign Application Priority Data

Apr. 30, 1976 Germany .............................. 2619353

[51] Int. Cl.² .............................................. G21C 19/28
[52] U.S. Cl. ........................................ 176/65; 176/40;
 176/60; 176/87
[58] Field of Search ..................... 176/40, 60, 65, 87

[56] References Cited

U.S. PATENT DOCUMENTS

| | | | |
|---|---|---|---|
| 3,331,747 | 7/1967 | Williamson ......................... | 176/65 X |
| 3,385,760 | 5/1968 | Hawkins ............................. | 176/65 X |
| 3,514,115 | 5/1970 | Gallo .................................. | 176/87 X |
| 3,850,796 | 11/1974 | Thome ................................ | 176/87 X |
| 3,926,722 | 12/1975 | Dupen ................................. | 176/87 |
| 4,001,079 | 1/1977 | Rylatt ................................. | 176/40 X |
| 4,038,134 | 7/1977 | Dorner et al. ..................... | 176/65 |
| 4,039,377 | 8/1977 | Andrieu et al. ................... | 176/60 X |

*Primary Examiner*—Peter A. Nelson
*Attorney, Agent, or Firm*—Kenyon & Kenyon, Reilly, Carr & Chapin

[57] ABSTRACT

A pressurized-water coolant reactor installation includes a reactor pressure vessel, a steam generator containing a heat exchanger through which coolant from the vessel is circulated, and a single pipe interconnecting the vessel and generator and internally divided into two conduits for conducting the coolant to the steam generator and from the latter back to the vessel. This single pipe is divided into these two conduits by a partition wall extending longitudinally for the length of the pipe inside of the pipe. This horizontal partition is formed by at least two sections extending radially from the inside of the coolant pipe towards each other and having inner edges spaced from each other and interconnected by an expansion joint.

10 Claims, 9 Drawing Figures

PRESSURIZED-WATER REACTOR INSTALLATION

BACKGROUND OF THE INVENTION

A pressurized-water coolant reactor installation ordinarily includes the reactor pressure vessel, a steam generator containing a heat exchanger through which the coolant from the vessel is circulated, and a coolant pump which draws or sucks the coolant from the heat exchanger's outlet and discharges it to the pressure vessel via a pipe line which forms a loop with one leg going from the vessel to the steam generator and the other leg, via the coolant pump, returning to the vessel.

The steam generator has a vertical housing with its lower portion closed by a tube sheet in which the inlet and outlet legs of an inverted U-shaped tube bundle heat exchanger are mounted, the housing below this tube sheet being partitioned to form inlet and outlet manifolds for the inlet and outlet ends of the heat exchanger. Ordinarily, a pipe from the vessel connects with the inlet manifold and a separate pipe connects the outlet manifold with the pressure vessel via the coolant pump.

The Michel U.S. Pat. No. 3,966,549, dated June 29, 1976, relates to an improvement wherein the coolant pump is built into the housing below the steam generator's tube sheet so that the loop piping is formed by a single pipe internally divided to carry the coolant from the pressure vessel to the steam generator and from the steam generator back to the vessel.

According to that Michel patent, the internal division is effected by the pipe being internally divided into the two necessary conduits by a transverse partition wall extending longitudinally for the length of the pipe inside of the pipe and having side edges welded to the inside of the pipe. It is suggested that this partition wall have a transverse curvature so that it is laterally deformable by bowing when the pipe thermally changes in diameter.

The temperature of the coolant carried by the pipe may range from a cold or reactor shutdown temperature of about 20° up to reactor operating temperatures of 350° C, and the integrity of the partition wall must be maintained throughout the consequent range of pipe diameter changes due to thermal expansion and contraction of the pipe.

SUMMARY OF THE INVENTION

The present invention is based on the discovery that at the joint between the partitioned pipe and the necessary thick-walled pressure vessel, the partition wall of the Michel patent can be subject to deformations that cannot be accommodated by the curvature of the partition wall, throughout the range of temperatures extending from the cold or shutdown condition of the reactor and its normal operating temperature.

Based on the above discovery, the present invention comprises an improvement wherein the coolant pipe's horizontal partition wall at least adjacent to the coolant connection with the reactor pressure vessel, is formed by at least two sections extending radially from the inside of the coolant pipe towards each other and having outer edges rigidly fixed to the pipe's inside, as by welding, and inner edges spaced from each and interconnected by an expansion joint permitting the two sections to move towards and away from each other during the radial pipe expansion and contraction occurring particularly adjacent to the pressure vessel. This expansion joint should be substantially, if not completely, fluid-tight, so that the hot and cold coolant flows are separated from each other. During the large changes in the pipe's diameter which occur particularly adjacent to the pressure vessel, the partition wall can now remain free from flexure at all times.

BRIEF DESCRIPTION OF THE DRAWINGS

The accompanying drawings show various examples of the present invention, the various figures being as follows.

DETAILED DESCRIPTION OF THE INVENTION

Figure 1:
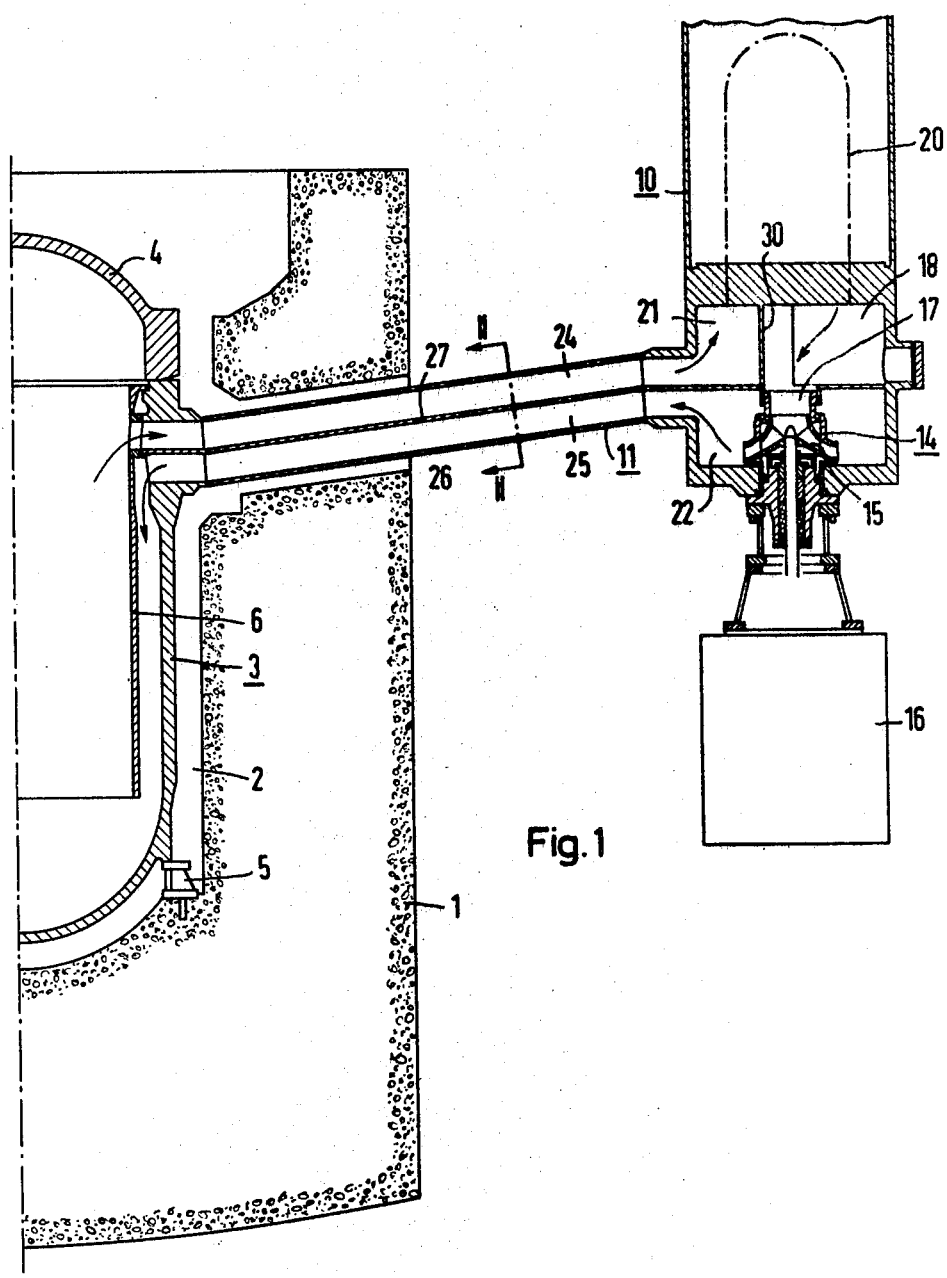
FIG. 1 is a vertical section showing the type of reactor installation previously mentioned.

The above drawings show concrete 1 forming a reactor pit 2 in which the steel pressure vessel 3 is supported on an annular support 5 by the bottom of the pit. The reactor core is not shown but the drawings do show the core vessel 6 in which the fuel elements are mounted. The vessel 6 forms a space between it and the inside of the vessel 3, coolant descending in this space and rising inside of the core vessel 6.

This coolant is used to generate steam in a steam generator 10, the connection being made via the pipe line 11 which extends straight or linearly between the steam generator and the vessel 3.

This steam generator 10 has an enclosure 10a formed below a tube sheet 10b. A coolant pump 14, having an impeller 15, is mounted in the lower portion of the housing 10a, the impeller 15 being driven by an external rotary motor 16 having a drive shaft 16a which extends up through a suitable stuffing box in the bottom of the housing 10a, to the impeller 15. A suction connection 17 of the pump 14 draws coolant from an outlet manifold chamber 18 for the outlet leg of the heat exchanger 20. This heat exchanger is indicated only by broken lines but it is to be assumed to be of the usual type comprising an inverted U-shaped bundle of tubes having all of their leg ends mounted in the tube sheet 10b and with their outlet leg ends opening to the outlet manifold space 18.

The housing 10a is completely divided by a horizontal wall 19 forming upper and lower spaces, a portion of this wall 19 defining the bottom of the manifold chamber 18 with the opening to which the suction inlet 17 connects. A vertical partition 30 partitions off space above the horizontal wall 19 to form an inlet manifold chamber 21 for the inlet leg ends of the heat exchanger 20. The pump 14 discharges into the lower space 22 formed below the horizontal wall 19. The housing 10a is provided with a connection 10a in the form of a cylindrical stub into which the partition 19 extends, thus providing the housing 10a with a single connection divided by the partition 19 into an upper coolant inlet and a lower coolant outlet, and it is to this connection that the pipe 11 is connected.

The divided coolant pipe is shown as comprising a cylindrical pipe 1' with its horizontal partition wall 2' consisting of two sections 3' and 4'. These two sections extend radially from the inside of the coolant pipe towards each other and have outer edges rigidly welded to that inside, as indicated at W, and inner edges which are spaced apart from each other to form a gap 5' which extends in the longitudinal direction of the pipe 1' and makes possible movement of the two sections relative to each other during the pipe diameter changes. In this case the gap 5' is offset from the axis of the pipe with one wall section being of substantially less extent than the other.

Figure 2:
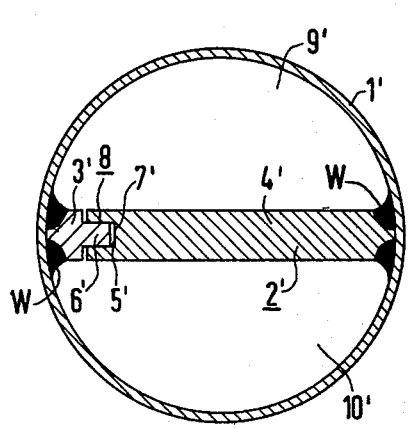
FIG. 2 is a cross section of the coolant pipe showing the new partition wall.

In FIG. 2 the expansion joint is formed by the inner edge of the section 3' being provided with a tongue 6' which slidingly fits in a groove 7' formed in the section 4'. In this way a tongue and groove expansion joint is formed, providing a seal between the space 9' which carries the coolant from the reactor to the steam generator and space 10' which carries the coolant from the pump back to the reactor pressure vessel. The sealing action need be only sufficient to prevent leakage losses between the two coolant flows which would noticeably degrade the efficiency of the installation.

It is to be understood that the gap 5' should be made large enough to permit the two partition sections to have the full amount of relative movement required to accommodate the full range of pipe diameter changes to be expected due to thermal changes occurring, particularly those occurring adjacent to or at the pressure vessel nozzle through which the pipe connects with the pressure vessel.

Figure 3:
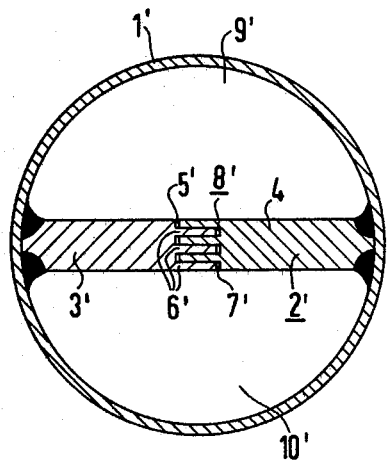
FIG. 3 is similar to FIG. 2 but shows a modification.

FIG. 3 shows the same construction excepting that in this case the gap 5' is positioned about on the axis of the pipe and a multiplicity of the tongues and grooves are formed on the inner edges of the two partition wall sections which are, in turn, of substantially equal extent with respect to each other. This simplifies the manufacture of the partition while the multiplicity of tongues and grooves provide what is, in effect a labyrinth seal for the expansion joint construction.

Figure 4:
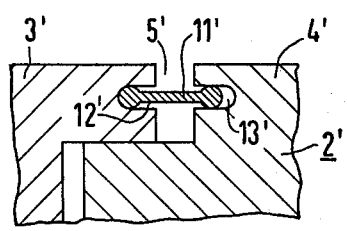
FIG. 4 on an enlarged scale shows a modification of the expansion joint.

In FIG. 4 a portion of a joint of the type shown by FIG. 2 is illustrated to provide an example of how additional sealing may be used. In this case the inner edges of the wall sections 3' and 4' accommodate a sealing gasket 11' through the provision of mutually opposed grooves 12' and 13' into which the sealing gasket 11' which is in the form of a spline, fits. The edges of this spline 11 are profiled to form transversely curved bearing surfaces engaging the sides of the grooves 12' and 13' to provide interbearing surfaces of small area. With this construction the spline 11' may be made of material having a larger coefficient of thermal expansion than the material from which the partition wall is made, so that the profiled spline edges or beads are pressed against the walls of the grooves 12' and 13' when hot operation prevails.

Figure 5:
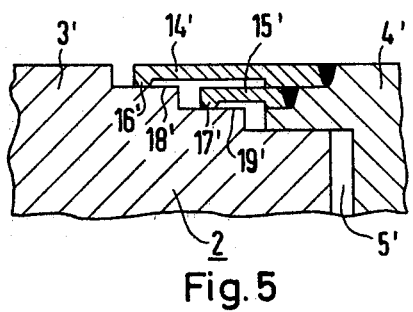
FIG. 5 is the same as FIG. 4 but shows a second modification.

In FIG. 5 the edge of the section 4' at the tongue and groove joint has strips or tabs 14' and 15' welded to it in appropriate rabbets formed in this end, with the edges of these parts provided with small area bearing projections 16' and 17', the section 3' being formed with steps 18' and 19', provided by the rabbets on that section, and on which the projections 16' and and 17' can press with high pressure. The small bearing surfaces involved permit high contact pressure between these sealing parts without preventing the desired relative movement of the partition wall sections.

Figure 6:
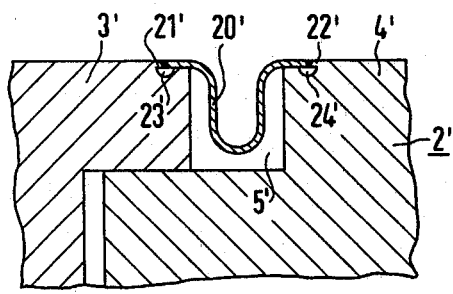
FIG. 6 is the same as FIG. 4 but shows another modification.

In FIG. 6 the tongue and groove joint is positively sealed by a bellows-type seal. This is effected by a metal strip 20' welded to steps 21' and 22' in the inner edges of the two wall sections. These strips are formed by grooves 23' and 24' to facilitate welding of the metal strip 20' without having to heat the partition sections too high. The metal strip 20° is transversely looped to form a single bellows fold.

Figure 7:
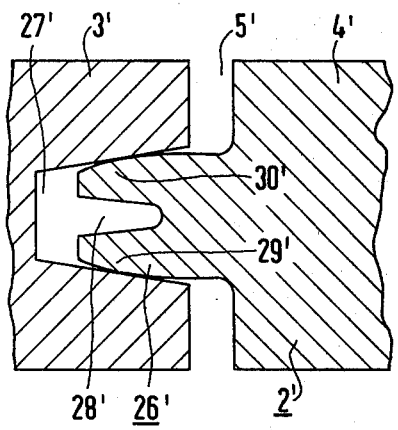
FIG. 7 on an enlarged scale shows a modification of the expansion joint shown by FIG. 2.

In FIG. 7 the tongue and groove expansion joint is formed with a tongue 26' which fits in an inwardly tapered groove 28'. The tongue is made in the form of two elastically deformable parts 29' and 30' separated by a slot 28'. As the tongue is pushed into the groove, the tongue can elastically be compressed or permitted to expand. By pretensioning this joint so that when cold the two parts 29' and 30' are elastically compressed together to at least some extent, a tight joint is obtained under all thermal conditions, the tongue springing apart more or less as the two wall sections move relative to each other. Pretensioning can be effected by clamping the two wall sections forcibly together during their insertion and welding within the pipe, the clamping pressure being thereafter released with the stress well carried by the pipe itself.

Figure 8:
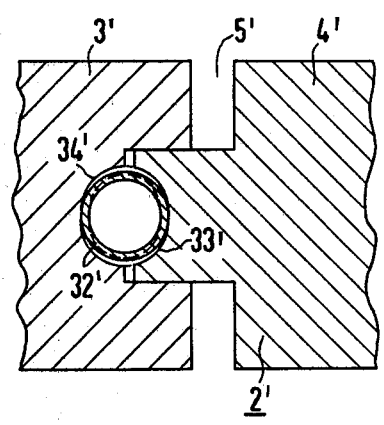
FIG. 8 is like FIG. 7 but shows still another modification.

A similar concept is shown by FIG. 8 where an elastically deformable metal tube 32' is placed in the gap 5' between the inner edges of the two wall sections. The surfaces 33' and 34' which abut this pipe can be contoured to generally match the contour of the tube 32'. A plurality of these tubes can be placed in the groove of the wall section 3' and in this case the joint may be pretensioned as described above.

Figure 9:
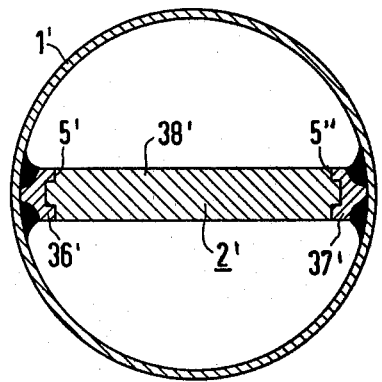
FIG. 9 is like FIG. 2 and serves to suggest that two or more expansion joints may be used.

Finally, FIG. 9 serves to show that the partition wall may be formed by more than only two sections. In this case two outer sections 36' and 37' have their outer edges welded to the pipe 1', the middle section 38' extending almost for the full diameter of the pipe. In this case the tongue and groove joints shown may either or both provide the expansion joint required to permit changes in the pipe diameter witnout flexing the partition.

What is claimed is:

1. A pressurized-water reactor installation comprising a vertical reactor pressure vessel with an upper portion having at least one coolant connection with a horizontal dividing wall, said vessel internally having means for conducting coolant from below said wall downwardly into the vessel and then upwardly for discharge above the wall, a coolant pipe connected to and extending from the vessel's said connection and containing a horizontal partition wall extending throughout its length and connected with said dividing wall of the vessel's connection, a vertical steam generator positioned adjacent to said vessel, said generator having a lower portion having a coolant connection with which said pipe is connected and internally having a horizontal tube sheet above the generator's said connection and a horizontal partition below the tube sheet and horizontally aligned with and connected with the pipe's said horizontal partition wall and having a vertical partition wall extending upwardly to said tube sheet transversely with respect to the generator's said connection and forming horizontally separated spaces below the tube sheet and above the generator's horizontal partition, one of said spaces being adjacent to and connected to said pipe above its said horizontal partition wall, the generator's said horizontal partition forming a lower space therebelow, a vertical coolant pump vertically positioned in said lower space and discharging thereinto and having a suction inlet connected to the other of said spaces, said lower space being connected with said pipe below its said partition wall, and a vertical motor for driving said pump and positioned below and outside of the generator's said lower portion, a vertical shaft extending through said lower portion and interconnecting said motor and pump; wherein the improvement comprises said horizontal partition wall at least adjacent to said coolant connection being formed by at least two sections extending radially from the inside of said coolant pipe towards each other and having outer edges rigidly fixed to said inside and inner edges spaced from each other and interconnected by an expansion joint.

2. The installation of claim 1 in which said expansion joint is formed by said inner edges being shaped to form a tongue and groove joint permitting said sections to move towards and away from each other.

3. The installation of claim 2 in which said inner edges at said tongue and groove joint form interspaced mutually opposed surfaces in which mutually opposed grooves are formed and a spline is inserted in said grooves.

4. The installation of claim 3 in which said spline has a coefficient of thermal expansion greater than said sections and has side edges shaped to form transversely curved bearing surfaces engaging the sides of said grooves.

5. The installation of claim 2 in which said inner edges at said tongue and groove joint are formed each with at least one rabbet and a strip is fixed in one of the rabbets and extends transversely to the other rabbet and bears forcibly thereon via an edge portion forming a bearing of small extent relative to that one of the rabbets and the strip's width.

6. The installation of claim 2 in which said tongue and groove joint is sealed by a bellows-type seal fixed to each of said inner edges.

7. The installation of claim 2 in which said tongue and groove joint has an inwardly tapered groove and an elastically compressible tongue.

8. The installation of claim 7 in which said joint is pretensioned so that when the joint is cold said tongue is elastically compressed to at least some extent.

9. The installation of claim 2 in which said tongue and groove joint contains an elastically compressible tube between the groove bottom and the tongue end.

10. The installation of claim 9 in which said joint is pretensioned so that when the joint is cold said tube is elastically compressed to at least some extent.

* * * * *